United States Patent
Rawat et al.

(10) Patent No.: US 12,258,092 B2
(45) Date of Patent: Mar. 25, 2025

(54) DRIVE SYSTEM FOR A SADDLE-TYPE VEHICLE

(71) Applicant: TVS MOTOR COMPANY LIMITED, Chennai (IN)

(72) Inventors: Ankit Rawat, Chennai (IN); Mugilan Meibalan, Chennai (IN); Chithambaram Subramoniam, Chennai (IN)

(73) Assignee: TVS MOTOR COMPANY LIMITED, Chennai (IN)

( * ) Notice: Subject to any disclaimer, the term of this patent is extended or adjusted under 35 U.S.C. 154(b) by 637 days.

(21) Appl. No.: 17/607,689

(22) PCT Filed: May 26, 2020

(86) PCT No.: PCT/IN2020/050473
§ 371 (c)(1),
(2) Date: Oct. 29, 2021

(87) PCT Pub. No.: WO2020/240588
PCT Pub. Date: Dec. 3, 2020

(65) Prior Publication Data
US 2022/0212744 A1   Jul. 7, 2022

(30) Foreign Application Priority Data

May 27, 2019   (IN) .............................. 201941020889

(51) Int. Cl.
*B62K 11/04*   (2006.01)
(52) U.S. Cl.
CPC .......... *B62K 11/04* (2013.01); *B62K 2204/00* (2013.01)

(58) Field of Classification Search
CPC ..................................................... B62K 11/04
See application file for complete search history.

(56) References Cited

U.S. PATENT DOCUMENTS

2005/0133282 A1*  6/2005  Huang ................... B62K 3/002
                                                                        180/180
2012/0111651 A1   5/2012  Irie et al.

FOREIGN PATENT DOCUMENTS

CN       202243932 U   *  5/2012
EP        1650120 A2   *  4/2006  ............. B62K 11/04
(Continued)

OTHER PUBLICATIONS

International Search Report issued in corresponding International Application No. PCT/IN2020/050473, mailed on Sep. 18, 2020 (3 pages).

(Continued)

*Primary Examiner* — Jacob D Knutson
(74) *Attorney, Agent, or Firm* — Osha Bergman Watanabe & Burton LLP

(57) ABSTRACT

A saddle type two-wheeled vehicle includes: a frame extending along a vehicle longitudinal axis; a swing arm journaled to the frame and adapted to support a rear wheel; and a drive system including one or more drive sources configured to deliver a driving force to the rear wheel. The one or more drive sources include a first drive source and a second drive source, the first drive source comprises at least one mounting portion integrally formed to at least a portion of the first drive source, at least one mounting portion is configured for removably mounting the first drive source on at least a portion of the swing arm, and the second drive source is detachably mounted on the rear wheel.

10 Claims, 2 Drawing Sheets

(56) References Cited

FOREIGN PATENT DOCUMENTS

JP          2015093627 A * 5/2015
WO    WO-2019059346 A1 * 3/2019 ............. B60K 11/04

OTHER PUBLICATIONS

Written Opinion issued in corresponding International Application No. PCT/IN2020/050473, mailed on Sep. 18, 2020 (5 pages).

* cited by examiner

DRIVE SYSTEM FOR A SADDLE-TYPE VEHICLE

TECHNICAL FIELD

The present subject matter relates to a saddle type vehicle. More particularly, the present subject matter relates to a drive system for a pure electrically-driven saddle type two-wheeled & three wheeled vehicles.

BACKGROUND

In recent times there is an increased demand to control emissions from automobiles, in view of stringent emission norms. As a result, a number of hybrid and electric vehicles are seeing the light of the day in order to minimize the amount of emissions. Typically, hybrid vehicles have distinct advantage of allowing long travel, as at least one source is always available to drive the vehicle. Hence, there is low risk of running out of fuel or getting stranded as it frequently happens with a traditional internal combustion powered vehicle.

Generally, existing hybrid vehicles configured to be powered either by an internal combustion engine or electric motor or both are replacing normal engine powered vehicles. For example, driving on terrain or for long distances, an internal combustion engine can be used and for shorter distances electric propulsion system can be used. However, incorporation of both internal combustion engine and electric motor assembly in the hybrid two-wheeled vehicle makes the system bulky and more complex. The vehicle's suspension, transmission, primary motor are designed for the additional weight of a redundant drive train and its fuel. Thus, pure electrically-driven two-wheeled vehicles have gained popularity in recent years as the potential replacement for internal combustion vehicles, since they promise zero emission from electric drive system, and a break away from oil dependency.

BRIEF DESCRIPTION OF THE DRAWINGS

The detailed description is described with reference to the accompanying figures. The same numbers are used throughout the drawings to reference like features and components.

DETAILED DESCRIPTION

Figure 1:
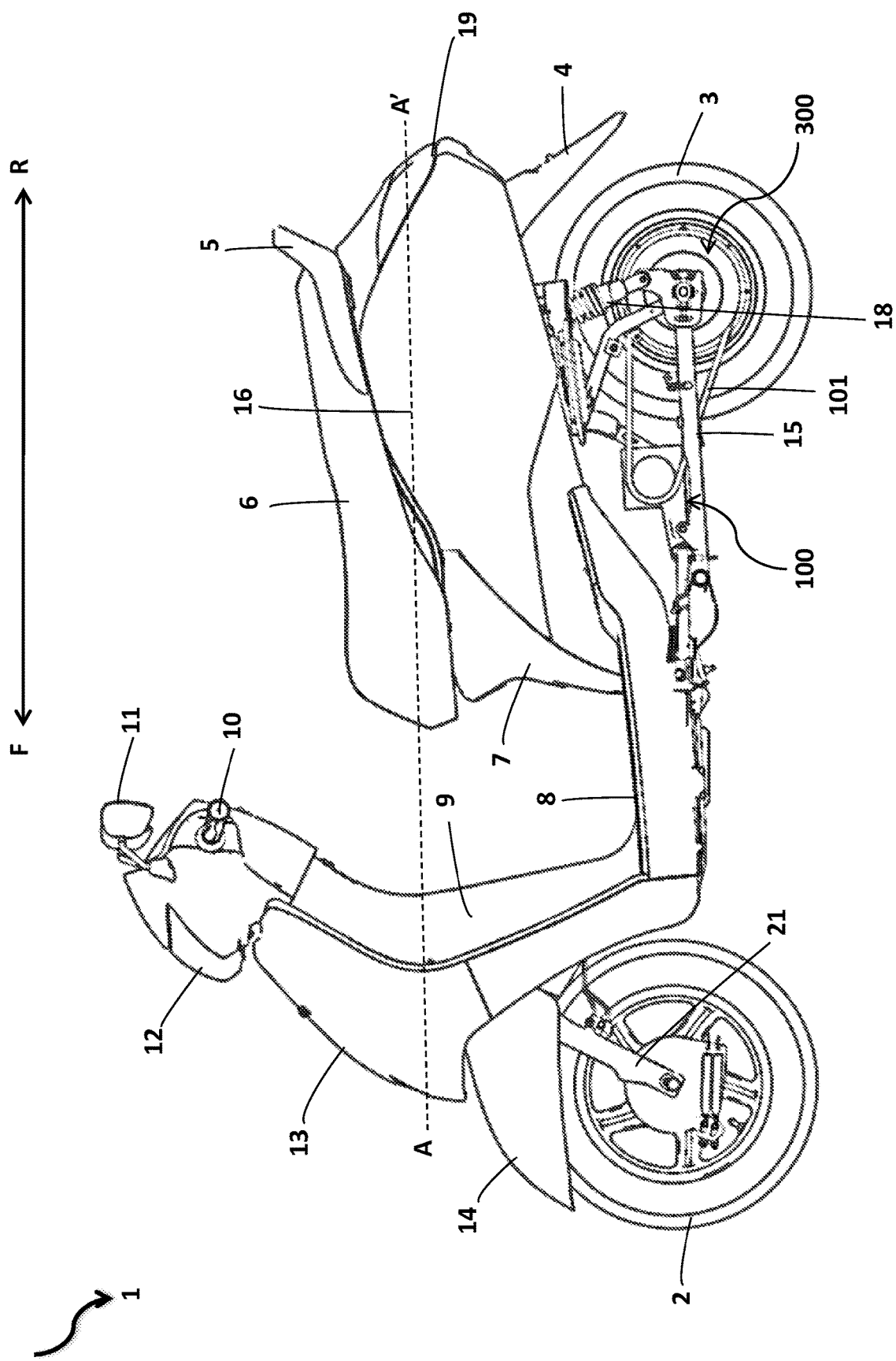
FIG. 1 is a side view of a pure electrically-driven two-wheeled vehicle, as per one embodiment of the present invention.

Vehicle manufacturers are increasingly focusing on vehicles having a pure electric drive which provides a cost effective, fuel efficient alternative to the conventional engine driven two-wheeled vehicle. However, with the transition of vehicles from internal combustion engine to hybrid and hybrid to a pure electric vehicle, manufacturer need to gear up to meet major challenges. For example, there are multiple problems, some of which have been identified, which combines to make the pure electric vehicles impractical for most applications today. For example, vehicle range is a major problem. Further, due to insufficient space and packaging constraint for an existing electric saddle type vehicle, the mounting of one or more additional drive sources requires further structural modification in at least a portion of the vehicle which may then increase the overall weight and cost for the vehicle.

Hence, there exists a need for an improved pure electrically-driven saddle type vehicle which can be readily derived from the conventional hybrid saddle type vehicle without bringing any structural modification for the existing hybrid two-wheeled vehicle layout. It is desirable to provide an improved electric saddle type vehicle that balances the independencies of one or more components of the existing hybrid driven saddle type vehicle during conversion of the hybrid driven saddle type vehicle into a pure electrically-driven saddle type vehicle and vice-versa, thereby maintaining the weight distribution, centre of gravity as well the dynamic stability including ride and handling performance of the vehicle. Further, it is desirable to provide an improved electric saddle type vehicle in a manner that provides the consumer with an economical solution in terms of fuel efficiency as well as reduction in emissions.

Moreover, there continues to be a need to provide an improved pure electrically-driven saddle type vehicle which can be easily derived from said existing hybrid saddle type vehicle by installing said one or more additional drive sources as a retro-fit application in an existing layout for hybrid saddle type vehicle. Further, it is desirable to provide an improved electric saddle type vehicle comprising of said one or more drive sources being configured to fit within the space and weight limitations of an engine mounting space of the existing hybrid saddle type vehicle without bringing any structural changes in the existing layout of the hybrid saddle type vehicle. Often based on different requirements in different markets & countries, manufacturers face a challenge of minimizing the variety of models & still offer different products within the same platform. Thus, it is desirable to have a vehicle design to be flexible to be able to quickly adapt to change from a IC engine set-up to a hybrid set-up or vice versa, or a hybrid set-up to an electric vehicle (EV) set-up or vice versa, or IC to EV set-up or vice versa, without having a need to change the design of the major systems of the vehicle e.g. chassis, layout, packaging etc. Under such scenario, there also exists a problem of achieving substantially similar dynamic behavior of the vehicle in terms of its dynamic characteristics & stability which pose a challenge with the design & layout of the vehicles known in the art.

With the above objectives in view, the existing hybrid saddle type vehicle is readily converted into a pure electrically-driven saddle type vehicle and vice-versa. In one embodiment, the present invention describes an improved pure electrically driven saddle type vehicles with an extended travelling range, power capacity, improved initial acceleration and torque performance. Further, one embodiment of the present invention provides said improved pure electrically-driven saddle type vehicle with said one or more drive sources and which is efficient at accelerating from a standing start. In one embodiment of the present invention, said one or more drive sources can be readily installed in said improved pure electric saddle type vehicle without bringing any structural innovation in the existing hybrid two-vehicle layout.

As per one embodiment, the present invention relates to an improved pure electrically-driven saddle type vehicle comprising of a low framework structure body frame having a floor board portion and a swing arm journaled to the frame and adapted to support a rear wheel. In one embodiment, said swing arm includes at least one mounting boss fixedly attached to at least a portion thereof. Further, the vehicle comprises a drive system including said one or more drive sources mounted on at least a portion thereof and configured to deliver power to the rear wheel by using the stored energy of said one or more energy storage devices being disposed on the vehicle. As per embodiment, said one or more drive sources comprises a first drive source and a second drive source. The first drive source is a primary electrical motor including at least one mounting portion integrally formed to at least a portion thereof and configured for being removably mounted on at least a portion of said swing arm through said at least one mounting boss. Further, the second drive source is a secondary electrical motor being incorporated into a hub body of the rear wheel. As per one embodiment of the present invention, said primary and said secondary electrical motor supplies a rotational driving force to the rear wheel.

Further, referring to one embodiment of the present invention, the primary electrical motor comprises a rotatably output shaft and a drive member at a distal end of the output shaft. As per one embodiment, a driven member is connected to said rear wheel. In one embodiment, said drive member and said driven member are pulleys. In another embodiment, said drive member and said driven member are sprockets. As one embodiment, said driven member is aligned on a rear wheel axle of the vehicle rear wheel. Further, as per one embodiment, the drive system for the vehicle includes a transmission member for power transmission from the primary electric motor to said rear wheel. In one embodiment, said transmission member is disposed between the drive member of the primary electrical motor and the driven member of the rear wheel. In one embodiment, said transmission member is a chain. In another embodiment, said transmission member is a drive belt.

Referring to one embodiment, said first drive source being the primary electrical motor and the second drive source being the secondary electrical motor are powered by said one or more energy storage devices being disposed on said vehicle. In one embodiment, said one or more energy storage device includes at least one primary energy storage device and at least one auxiliary energy storage device. As per one embodiment, said at least one supporting structure configured to house said at least one auxiliary energy storage device therein is disposed in a space defined between said first drive source mounted on the swing arm and a utility box dismountably supported on a rear portion of the vehicle frame. Particularly, in one embodiment, said at least one supporting structure is longitudinally and vertically offset from said swing arm and said first drive source, respectively. In one embodiment of the present invention, said at least one supporting structure configured to hold said at least one auxiliary energy storage device therein is removably secured to a rear portion of said frame through at least one holder member. In one embodiment, said at least one holder member is fixedly attached to said rear portion of said frame through welding. In one embodiment, at least one controller unit configured to manage an operation of said one or more energy storage devices is disposed forwardly of said at least one supporting structure through at least one mounting bracket. In one embodiment, a storage member for storing a charging unit is disposed on a front portion of the vehicle frame. In one embodiment, the charging unit is configured to enable charging of said one or more energy storage devices.

Referring to one embodiment of the present invention, the assembly of the primary electrical motor device on the swing arm of the vehicle facilitates in its appropriate cooling by enhancing the heat dissipation, reduces transmission losses and in addition enhances the power transmission efficiency. Further, in such an configuration, the primary electrical motor becomes easily accessible for servicing and maintenance. Furthermore, the mounting of said secondary electrical motor to the hub of the rear wheel generates high torque at low rotations per minute (RPM) which translates to less weight, less complexity, and better efficiency and in addition removes power during regenerative braking to recharge said one or more energy storage devices being disposed on the vehicle.

Referring to one embodiment, said improved pure electrically driven saddle type vehicle comprises said one or more drive sources including the primary electrical motor and the secondary electrical motor which have different drive ratios, different efficiency to provide efficient operation over a wider speed range than possible with a single motor. In another embodiment of the present invention, said one or more drive sources have the same efficiency at any given vehicle speed.

In one embodiment, the present invention relates to an improved pure electrically driven saddle type vehicle in which the first drive source including the primary electrical motor is removably mounted on said at least a portion of the swing arm of the vehicle such that the unsprung mass of the vehicle rear suspension is lowered substantially thereby ensuring good riding comfort & stability of the vehicle. Thus, as per one embodiment of the present invention the mounting of said first drive source of said one or more drive sources on the vehicle delivers high power with low unsprung mass and high torque-density. Hence, as per one embodiment of the present invention, said one or more drive sources on the vehicle can adapt to the vehicle's operating conditions such as starting, accelerating, maneuvering, turning, and braking at high speeds, thereby consistently providing higher performance & desirable dynamic/handling characteristics.

As per one embodiment, in conversion of said existing hybrid saddle type vehicle into said pure electrically driven two-wheeled vehicle and vice versa, said first drive source of said one or more drive sources is mounted in the space on the swing arm which was previously required for the mounting of said engine in hybrid two-wheeled vehicle configuration. Thus, said mounting of said first drive source enhances the balance of the vehicle by maintaining the rearward position of the vehicle center of gravity of the vehicle and thereby facilitating the desired weight distribution between the front and rear wheel of the vehicle. This as well ensures the overall center of gravity of the vehicle is maintained substantially within the existing hybrid saddle type vehicle enabling consistent vehicle performance characteristics irrespective of the type of power train of the vehicle.

Referring to one embodiment, the present invention relates to said first drive source of said one or more drive sources being removably mounted to said swing arm of the vehicle such that said first drive source do not touch said utility box being disposed below the seat assembly, thereby maintaining the optimum storage space of the utility box. Thus, said hybrid saddle type vehicle is readily converted into said pure electrically-driven saddle type vehicle through mounting of an additional one or more drive sources in the form of said primary and secondary electrical motors on the vehicle without bringing any structural modification in the existing hybrid saddle type vehicle layout.

It is an object of the present invention to provide a novel electrical drive system for said pure electrically-driven saddle type vehicle which includes said primary electrical motor and said secondary electrical motor, powered by said one or more energy storage devices. In one embodiment, said first drive source and said second drive source are adapted to facilitate a long travelling range and improved torque performance for the vehicle.

In an implementation, the present subject matter is configured to provide an improved layout of a pure electrically-driven saddle type vehicle derived from the existing hybrid saddle type vehicle by replacing said primary drive source viz. engine or primary electrical motor mounted on the swing arm by said first drive source of said one or more drive sources. As per one embodiment, said first drive source is the primary electrical motor. In one embodiment, said at least one mounting boss being fixedly attached through welding to at least a portion of said swing arm to mount said engine in the existing hybrid saddle type vehicle configuration is utilized in removably mounting said first drive source of said one or more drive sources on the vehicle. Thus, as per one embodiment, said hybrid saddle type vehicle when retrofitted with said first drive source in said engine mounting space by detaching said engine from swing arm, is converted into said pure electrically-driven saddle type vehicle. Thus, said pure electrically-driven saddle type vehicle including said one or more drive sources including said primary and secondary electric motors being powered by said one or more energy storage devices provides a long travelling range and improved initial torque performance for the vehicle.

Various other features and advantages of the invention are described in detail below with reference to the accompanying drawings. In the drawings, like reference numbers generally indicate identical, functionally similar, and/or structurally similar elements. The drawing in which an element first appears is indicated by the leftmost digit(s) in the corresponding reference number. With reference to the accompanying drawings, wherein the same reference numerals will be used to identify the same or similar elements throughout the several views. It should be noted that the drawings should be viewed in the direction of orientation of the reference numerals.

It is to be noted that in the ensuing description, the present invention is usable in a saddle type vehicle exemplified in the form of a pure electrically driven two-wheeled scooter type vehicle.

Further "front" and "rear", and "left" and "right" referred to in the ensuing description of the illustrated embodiment refer to front and rear, and left and right directions as seen in a state of being seated on a seat of the two-wheeled vehicle. Furthermore, a longitudinal axis refers to a front to rear axis relative to the vehicle, while a lateral axis refers to a side to side, or left to right axis relative to the vehicle. Also, it is to be understood that the phraseology and terminology used herein is for the purpose of description and should not be regarded as limiting.

With reference to FIG. 1, a description is made of a pure electrically driven two-wheeled vehicle (hereinafter "vehicle") as per one embodiment of the present invention. In one embodiment, the vehicle (1) illustrated, has a low framework structure body frame (200) (shown in FIG. 2) having a floor board portion (8). The vehicle (1) further includes a plurality of body panels for covering the frame (200) and is mounted thereto. The plurality of body panels includes a front panel (13), a leg shield (9), an under-seat cover (7), and a left and a right-side panel (16). Further, a seat assembly (6) is disposed above said under-seat cover (7). A utility box (not shown) is disposed below the seat assembly (6). A pillion handle (5) is disposed behind said seat assembly (6). A front fender (14) is disposed above a front wheel (2) and between left and right suspensions (21) supporting the front wheel (2). A rear fender (4) is configured for covering at least a portion of a rear wheel (3). One or more suspension(s)/shock absorbers (18) are provided in a rear portion (R) of said vehicle (1) for comfortable ride. Further, said vehicle (1) comprises of plurality of electrical and electronic components including a headlight (12), a taillight (19), a transistor controlled ignition (TCI) unit (not shown), a starter motor (not shown) and the like. A touch screen LCD unit (not shown) is provided on a handle bar (10) to display various operating modes, power flow pattern and warning signals. A pair of left and right rear view mirrors (11) are mounted on the right and left sides of the handle bar (10). In one embodiment, said vehicle (1) is also provided with hazard lamps (not shown).

Further in FIG. 1, as per one embodiment, the drive system (20) of said vehicle (1) comprises said one or more drive sources (100), (300) being disposed on at least a portion thereof. In one embodiment, said one or more drive sources (100), (300) includes the first drive source (100) and the second drive source (300). In one embodiment, said first drive source (100) is arranged behind said floor board portion (8). Particularly, as per one embodiment, the first drive source (100) is a primary electrical motor including said at least one mounting portion (100a), (100b) integrally formed to at least a portion thereof and configured for being removably mounted on at least a portion of said swing arm (15) through said at least one mounting boss (102), (103) (shown in FIG. 2) being fixedly attached therein. The swing arm (15) is attached to at least a portion of the vehicle frame (200) by means of a toggle link (not shown). The other end of the swing arm (10) holds the rear wheel (3). The rear wheel (3) and the swing arm (15) are connected to the frame (200) by a pair of shock absorbers (18) provided on either side of the vehicle (1). Further, in one embodiment, the second drive source (300) being a secondary electrical motor and being incorporated into a hub body of the rear wheel (3) supplies a rotational driving force to the rear wheel (3). In one embodiment of the present invention, the vehicle (1) is configured to be propelled by the first drive source (100) and the second drive source (300) of said one or more drive sources (100), (300).

Figure 2:
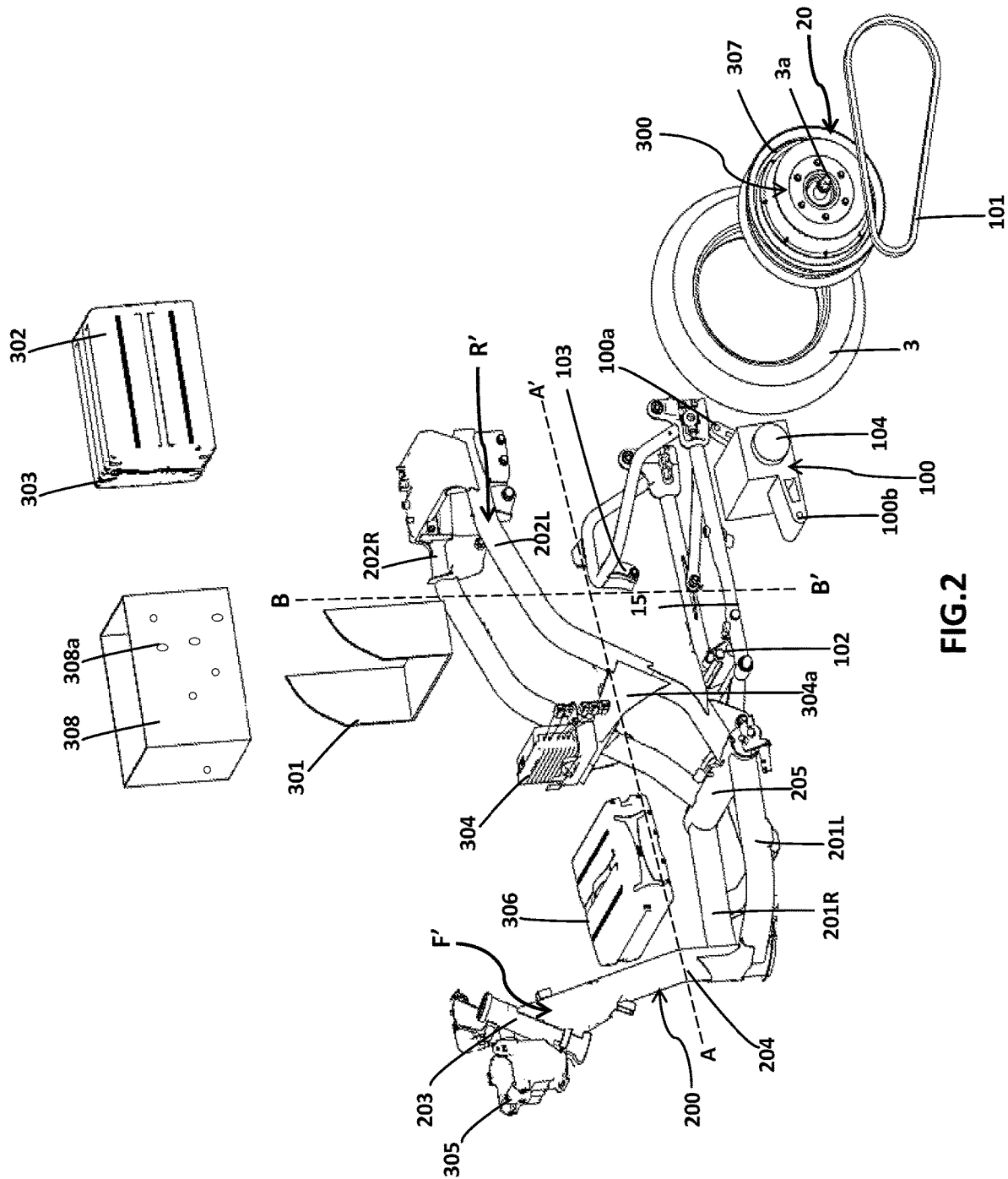
FIG. 2 is a perspective exploded view of the pure electrically-driven two-wheeled vehicle as per one embodiment of the present invention.

FIG. 2 is a perspective view of the vehicle (1) illustrating the mounting of said one or more drive sources (100), (300) and said one or more energy storage devices (302), (303), (306) on the vehicle (1) as per one embodiment of the present invention. In one embodiment, said one or more drive sources (100), (300) includes the first drive source (100) and the second drive source (300). The first drive source (100) is the primary electrical motor (100) removably mounted on said at least a portion of the swing arm (15) and the second drive source (300) is the secondary electrical motor being mounted on the hub-body of the rear wheel (3) of the vehicle (1).

Further, as per one embodiment, said vehicle (1) comprises of the frame (200) extending along the vehicle longitudinal axis (AA). In one embodiment, the vehicle frame (200) includes a head tube (203), a main tube (204) extending obliquely downwardly from a lower portion of the head tube (203), a pair of left and right floor tubes (201L), (201R) joined to a lower part of the main tube (204) and both extending from the lower part of the main tube (204) towards the rear of the vehicle (1), a cross tube (205) joined to both rear-end parts of the floor tubes (201L), (201R) and extending in a lateral direction and the pair of left and right rear frames (202L), (202R) extending upward and to the rear of the vehicle (1). In one embodiment, front-end parts of the rear frames (202L), (202R) are being joined to respective left and right ends parts of the cross-tube (205). As per one embodiment, the swing arm (15) is journaled to the frame (200) and adapted to support the rear wheel (3). Referring to one embodiment, the seat assembly (6) is disposed above said under-seat cover (7), and is mounted to the rear portion (R') of the frame (200). In one embodiment, said vehicle (1) comprises of said one or more drive sources (100), (300) being powered by said one or more energy storage devices (302), (303), (306) to drive the vehicle (1).

As per one embodiment, said one or more energy storage devices (302), (303), (306) includes said at least one primary energy storage device (306) and said at least one auxiliary energy storage device (302), (303). Further, as per one embodiment, said at least one supporting structure (308) configured for housing said auxiliary energy storage device (302), (303), is disposed in the space defined between said first drive source (100) and the utility box being disposed below said seat assembly (6). Particularly, said at least one supporting structure (308) is arranged above the first drive source (100) such that said at least one supporting structure (308) and the vehicle drive system (20) are individually spaced from each other. In one embodiment, said at least one supporting structure (308) is removably secured to said at least a portion of said pair of left and right rear frames (202L), (202R) in the rear portion (R') of said frame (200) through at least one holder member (301). In one embodiment, said at least one supporting structure (308) comprises at least one air guide structure (308a) formed in at least a portion thereof for providing cooling effect to said at least one energy storage device (302), (303) housed therein. As per one embodiment, said at least one holder member (301) is fixedly attached to the rear portion (R') of said frame (200) through welding. Referring to one embodiment, said at least one supporting structure (308) is offset from said swing arm (15) in said vehicle longitudinal axis (AA'). In one embodiment, said at least one supporting structure (308) is offset from said first drive source (100) in the vehicle vertical axis (BB'). As per one embodiment, said vehicle vertical axis (BB') is perpendicular to said vehicle longitudinal axis (AA'). As per one embodiment, said at least one controller unit (304) configured to manage an operation of said one or more energy storage devices (302), (303), (306) is placed forward relative to said at least one supporting structure (308). In one embodiment said at least one controller unit (304) is adapted for supplying electric power to the first drive source (100) and the second drive source (300).

Furthermore, as per one embodiment of the present invention the swing arm (15) includes said at least one mounting boss (102), (103) fixedly attached to said at least a portion thereof. As per one embodiment, the first drive source (100) comprises of said at least one mounting portion (100a), (100b) integrally formed to at least a portion thereof. In one embodiment, said at least one mounting portion (100a), (100b) are configured for removably mounting said first drive source (100) being the primary electric motor on said at least a portion of said swing arm (10) through said at least one mounting boss (102), (103). Referring to one embodiment, said first drive source (100) being the primary electric motor comprises of said rotatably output shaft and the drive member (104) at a distal end of the output shaft. Further, in one embodiment, the driven member (307) is connected to said rear wheel (3). In one embodiment of the present invention, said drive member (104) and the driven member (307) are pulleys. In another embodiment, said drive member (104) and the driven member (307) are sprockets. As per one embodiment, said drive member (307) is aligned on the rear wheel axle (3a) of the vehicle rear wheel (3). In one embodiment, the vehicle drive assembly (20) includes said transmission member (101) for power transmission from the first drive source (100) to said rear wheel (3). In one embodiment, said transmission member (101) is disposed between the drive member (104) of the electric motor (100) and the driven member (307) of the rear wheel (3). As per one embodiment, said transmission member (101) is a chain. As per another embodiment, said transmission member (101) is a drive belt.

Further in FIG. 2, as per one embodiment, said at least one controller unit (304) configured to manage an operation of said one or more energy storage devices (302), (303), (306) is disposed forwardly of said at least one supporting structure (308) through said at least one mounting bracket (304a). Further, said at least one mounting bracket (304a) is fixedly attached to at least a portion of said pair of right and left rear frames (202L), (202R). As per one embodiment, said one or more energy storage devices (302), (303), (306) are rechargeable batteries. In one embodiment said one or more energy storage devices (302), (303), (306) includes said at least one primary energy storage device (306) and said at least one auxiliary energy storage device (302), (303). In one embodiment, said at least one primary energy storage device (306) is detachably mounted to said pair of left and right floor tubes frames (201L), (201R) such that said at least one primary energy storage device (306) is located below said floor board portion (8) of the vehicle (1) and said at least one auxiliary energy storage device (302), (303) is disposed below said utility box of the vehicle (1). Referring to one embodiment of the present invention, the charging unit (not shown) configured to enable charging of said one or more energy storage devices (302), (303), (306) is housed in the storage member (305). In one embodiment, the storage member (305) is disposed on the front portion (F') of the vehicle frame (200).

It is advantageous to provide an improved pure electrically driven saddle type vehicle in which the installation of said one or more drive sources including primary and secondary electric motors depends on the customer as well as market requirements for achieving an enhanced initial acceleration performance in starting, vehicle performance such as extended travelling range, design flexibility in at least a portion of the vehicle to accommodate said one or more drive sources therein and one or more variants of the vehicle, for example, the vehicle powered by the engine, the electric motor or both requiring the installation of said one or more energy storage devices on the vehicle. Further, advantageously, the present invention provides an improved pure electrically driven two-wheeled vehicle that can replace an internal combustion engine with one or more drive sources without bringing any structural modification in the existing hybrid driven saddle type vehicle layout such that said one or more drive sources is configured to be removably mounted within the space and weight limitations of the engine mounting space of the existing hybrid saddle type vehicle. Thus, as per one embodiment, the present invention provides an improved pure electrically driven saddle type vehicle that is designed with primary focus on ease of conversion, optimization of power generation and use.

Improvements and modifications may be incorporated herein without deviating from the scope of the invention.

We claim:
1. A two-wheeled vehicle, the two-wheeled vehicle comprising:
   a frame extending along a vehicle longitudinal axis;
   a swing arm journaled to the frame and adapted to support a rear wheel; and a drive system including one or more drive sources configured to deliver a driving force to the rear wheel, wherein the one or more drive sources include a first drive source and a second drive source, the first drive source comprises at least one mounting portion integrally formed to at least a portion of the first drive source, the at least one mounting portion is configured for removably mounting the first drive source on at least a portion of the swing arm, and the second drive source is detachably mounted on the rear wheel.

2. The two-wheeled vehicle as claimed in claim 1, wherein the first drive source is a primary electrical motor.

3. The two-wheeled vehicle as claimed in claim 1, wherein the second drive source is a secondary electrical motor.

4. The two-wheeled vehicle as claimed in claim 3, wherein the second drive source is integrally mounted at a hub of the rear wheel of the two-wheeled vehicle.

5. The two-wheeled vehicle as claimed in claim 1, wherein the first drive source comprises a rotatable output shaft and a drive member at a distal end of the output shaft.

6. The two-wheeled vehicle as claimed in claim 1, wherein the swing arm includes at least one mounting boss fixedly attached to at least a portion of the swing arm.

7. The two-wheeled vehicle as claimed in claim 1, wherein the at least one mounting portion is configured for removably mounting the first drive source on at least a portion of the swing arm through at least one mounting boss of the swing arm.

8. The two-wheeled vehicle as claimed in claim 1, wherein the drive system includes a transmission member adapted for power transmission from the first drive source to the rear wheel.

9. The two-wheeled vehicle as claimed in claim 8, wherein the transmission member is disposed between a drive member of the first drive source and a driven member of the rear wheel.

10. The two-wheeled vehicle as claimed in claim 1, wherein the first drive source configured to be offset from at least one supporting structure in a vehicle vertical axis, and the at least one supporting structure is configured to hold one or more energy storage devices in the at least one supporting structure.

* * * * *